April 17, 1928.
E. NIETHAMER
1,666,503
STREET INDICATING AND ANNUNCIATING DEVICE
Filed Jan. 24, 1922  5 Sheets-Sheet 1
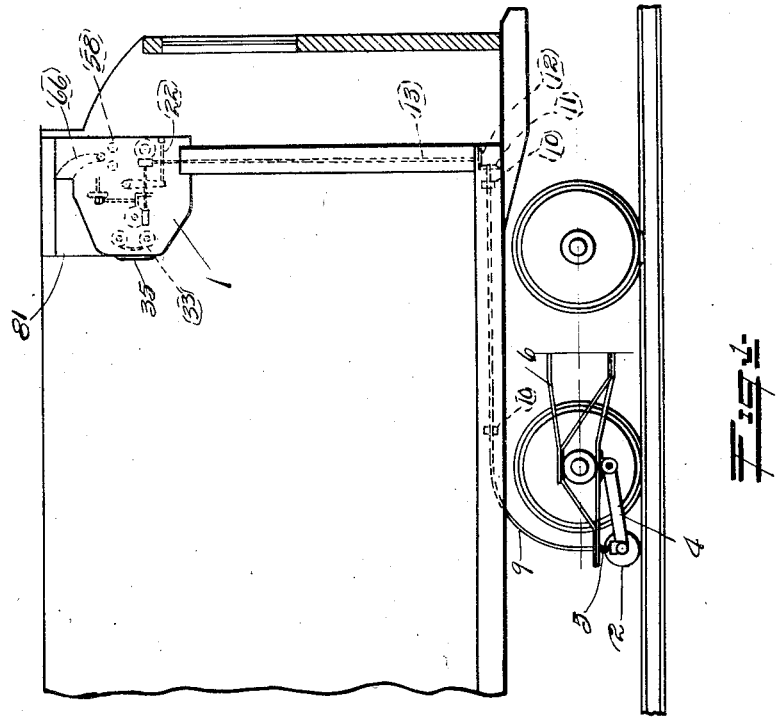
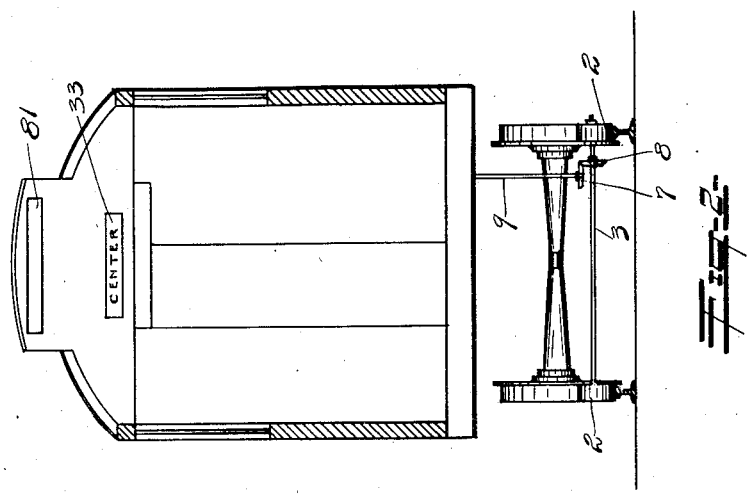
INVENTOR.
Edward Niethamer
BY
Frank C. Fearman
ATTORNEY.

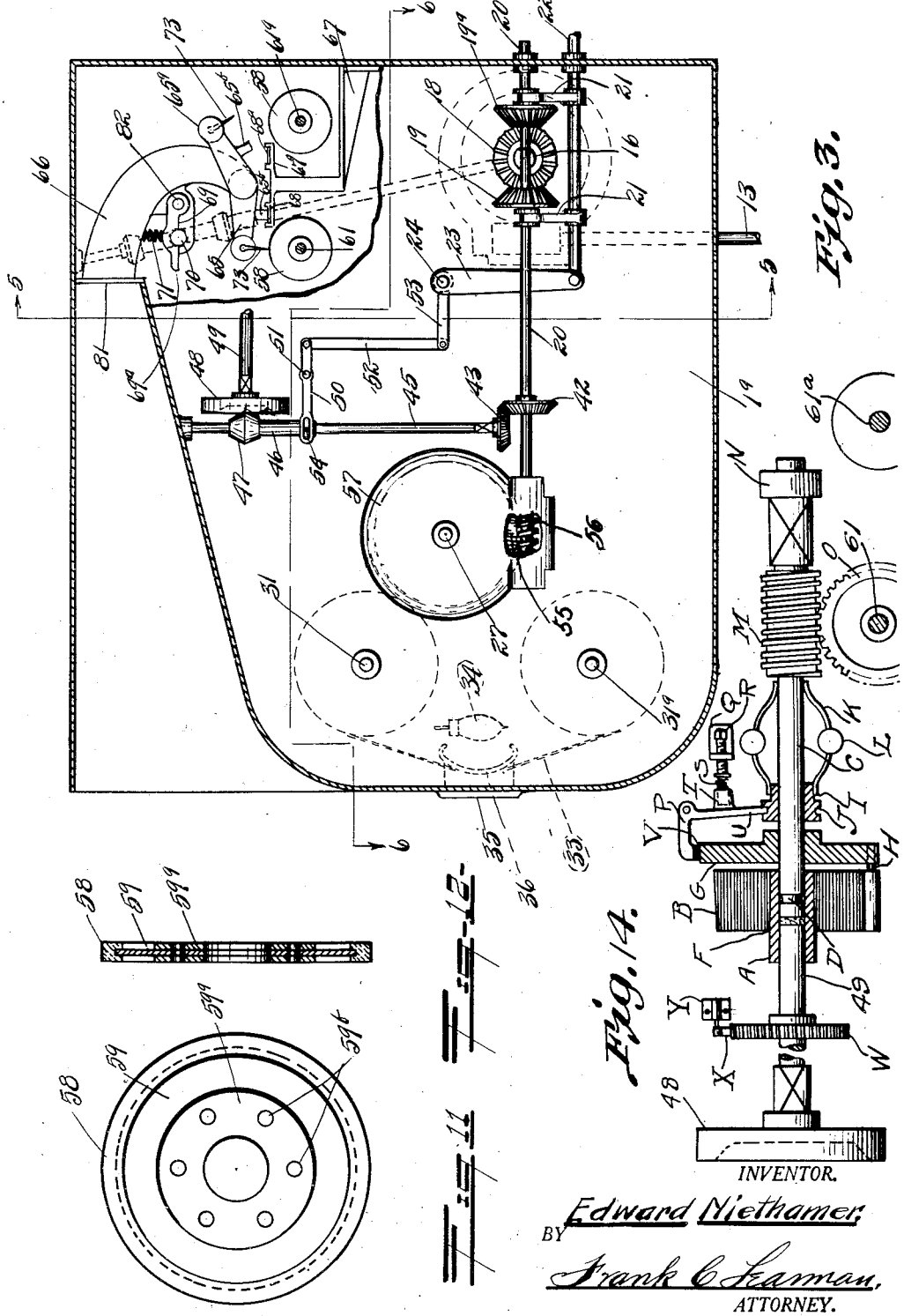

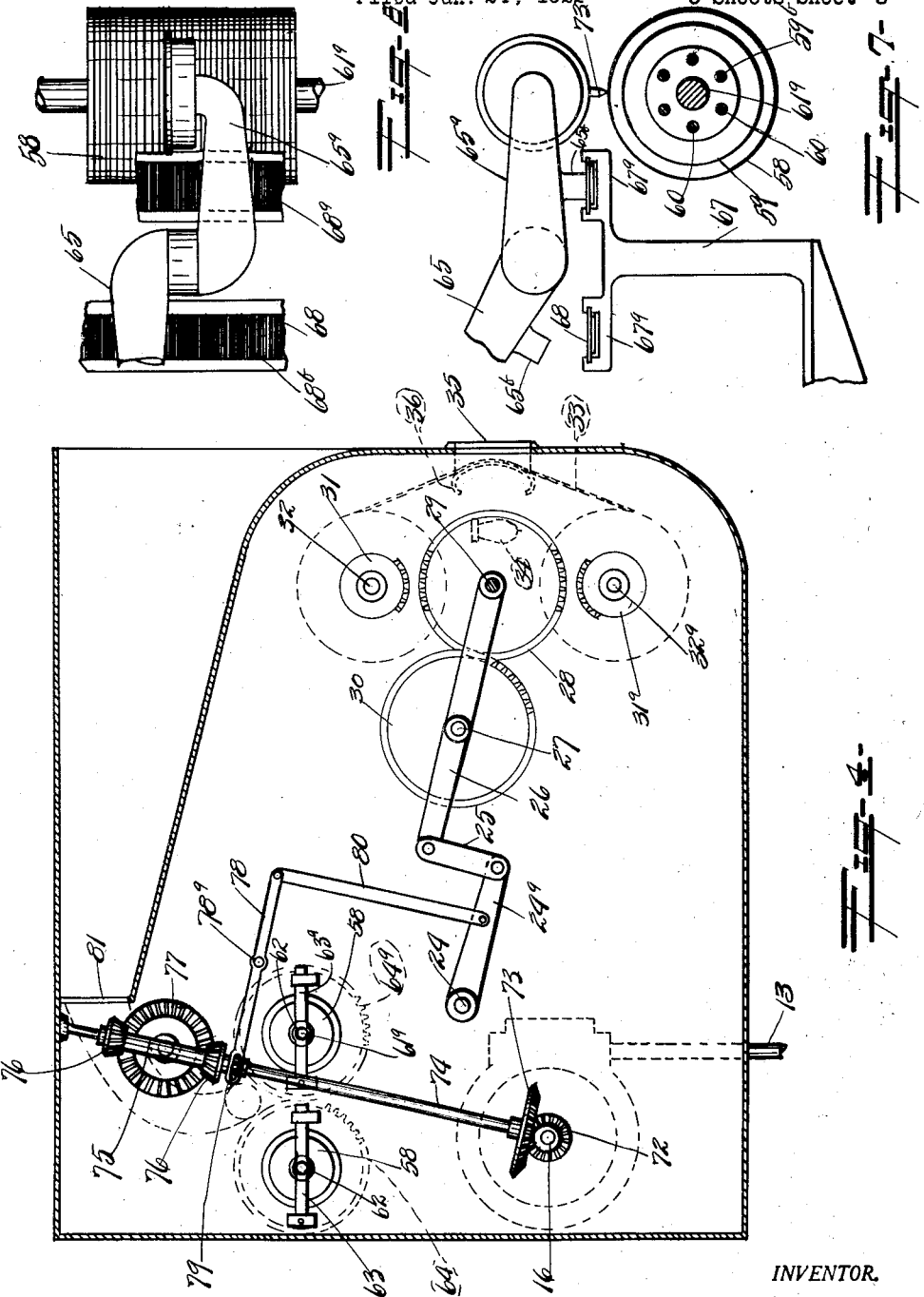

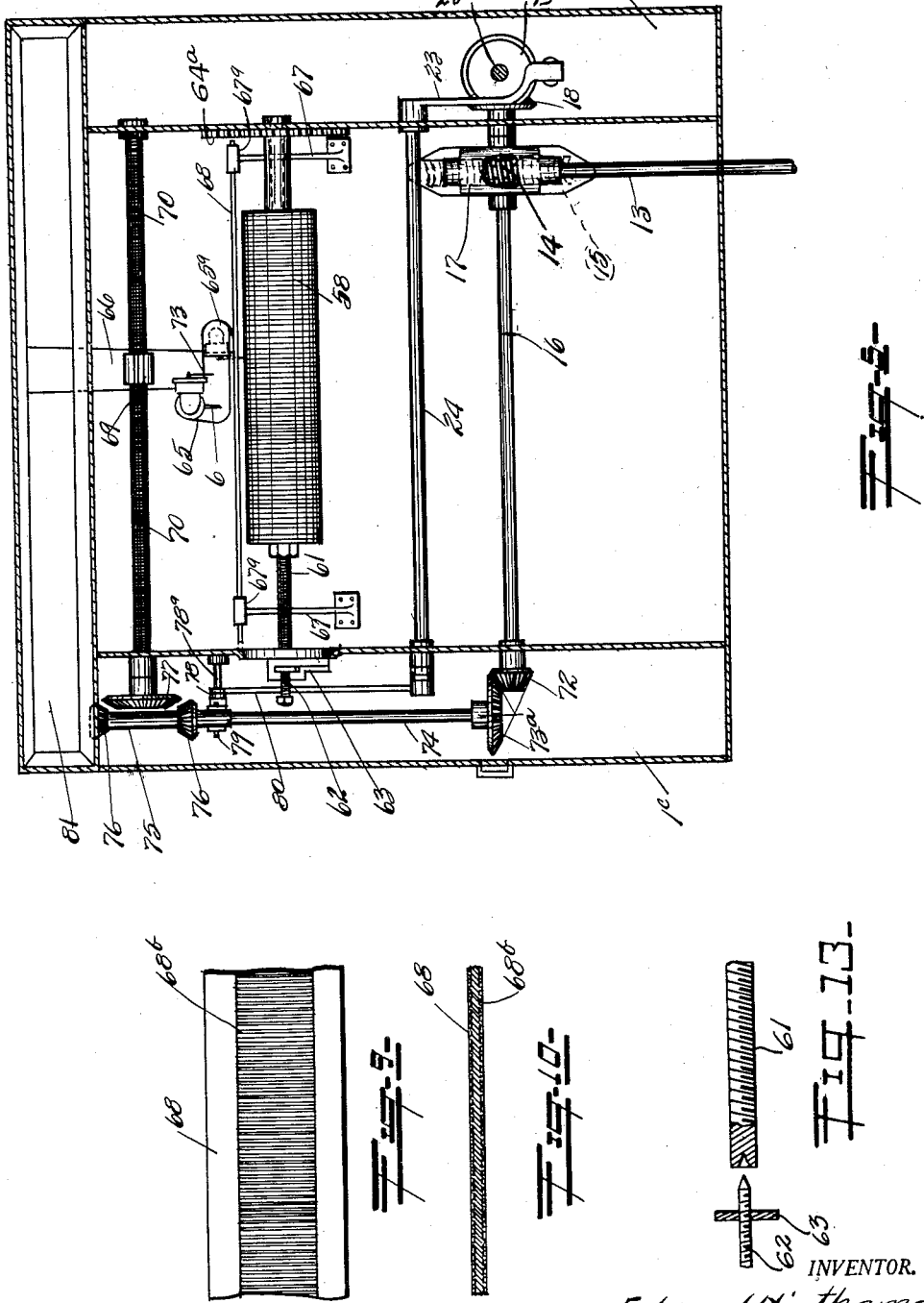

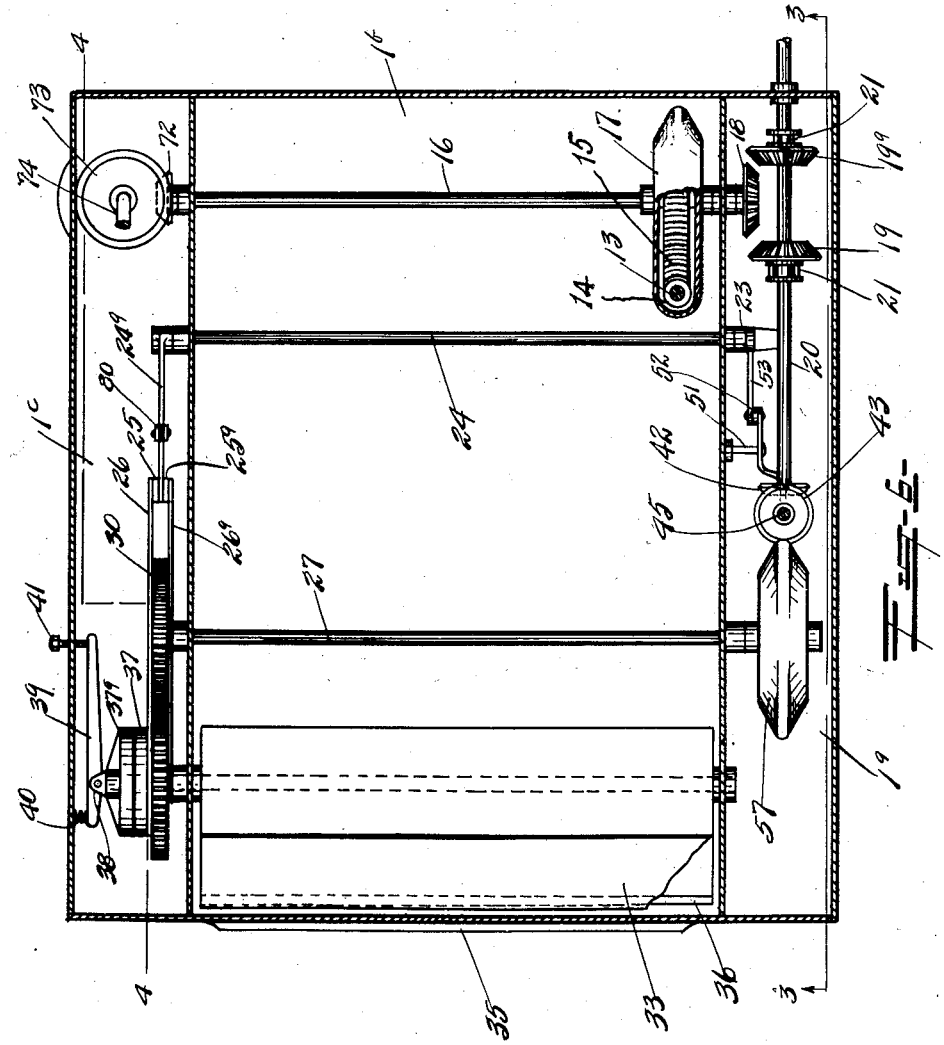

Patented Apr. 17, 1928.

1,666,503

UNITED STATES PATENT OFFICE.

EDWARD NIETHAMER, OF BAY CITY, MICHIGAN.

STREET INDICATING AND ANNUNCIATING DEVICE.

Application filed January 24, 1922. Serial No. 531,493.

This invention relates to automatic street calling and displaying devices, and constitutes a continuation in part of the application filed March 26th, 1921, Serial No. 456,027.

One object of the invention is to provide a device which will automatically call the names of the streets as the car travels over the rails, thereby relieving the regular conductor of this responsibility and which the conductor ofttimes forgets.

Another object is to design a street name displaying device which will operate simultaneously with the calling mechanism, and which will automatically display the names of the different streets as they are being called by the mechanical annunciator.

A further object of the invention is to provide novel means for mounting the records on which the sound grooves are formed so that they can be readily removed or replaced, either for the purpose of changing one of the records, removing to another car, or for any other reason.

A still further object is to provide means whereby the passengers may be entertained by providing suitable music, and also to provide a highly desirable and efficient advertising medium.

With the above and other objects in view, the present invention consists in the combination and arrangement of parts, hereinafter more fully described, illustrated in the accompanying drawings, and particularly pointed out in the appended claims, it being understood that changes may be made in the form, size, proportion and minor details of construction, without departing from the spirit or sacrificing any of the advantages of the invention.

In the drawings:—

Figure 1 is a cross sectional side view of the conventional electric car illustrating my improved device in position therein.

Figure 2 is a transverse sectional view looking towards the front of the car.

Figure 3 is a longitudinal section taken on the line 3—3 of Fig. 6.

Figure 4 is a sectional view taken on the line 4—4 of Fig. 6, the device facing in opposite direction to that shown in Fig. 6.

Figure 5 is a transverse sectional view taken on the line 5—5 of Fig. 3.

Figure 6 is a top plan sectional view taken on the line 6—6 of Fig. 3.

Figure 7 is an enlarged fragmentary detail of the annunciating mechanism.

Figure 8 is a top plan view thereof.

Figure 9 is an enlarged fragmentary plan of the needle and tone arm raising means, and Figure 10 is a sectional view thereof.

Figure 11 is an enlarged side view of one of the records, and

Figure 12 is a cross sectional view thereof.

Fig. 13 is a detailed view illustrating the construction of the end bearing for the threaded shaft upon which the records are mounted.

Fig. 14 is a sectional view illustrating the construction of the spring mechanism for actuating the device.

Fig. 15 is a detailed sectional view illustrating the means for swiveling the governor shaft to the sleeve upon which the barrel spring is mounted.

Referring now particularly to the drawings in which I have shown the preferred embodiment of my invention the device comprises a suitable sheet metal case 1 detachably secured in the interior of the car, and preferably at the front end thereof. This case can be made of wood if desired, and is formed with three compartments 1ª, 1ᵇ and 1ᶜ respectively, which are adapted to house the operating mechanism. This mechanism is adapted to be controlled and actuated by track engaging wheels 2 which are mounted on a transversely disposed shaft 3, and hingedly connected in the rear of the ordinary car truck by means of the bar members 4, and coiled springs 5 are interposed between the arch bar 6 of the truck and the frame in which the wheels 2 are mounted. A ratcheting element (not shown) being provided on each wheel to allow one wheel to ratchet when turning a corner, etc. A bevel gear 8 is secured on the shaft 3 and engages a similar gear 7 secured on the lower end of a flexible shaft 9, this shaft being journaled in suitable boxes 10, and a bevel gear 11 being secured on the opposite end thereof, meshing with and actuating a gear 12 keyed to a vertically disposed shaft 13 which is journaled in suitable bearings, and extends into the case 1 for imparting motion to the mechanism mounted therein. A worm 14 is mounted on the end of this vertically disposed shaft and engages with a worm wheel 15 mounted on the longitudinally disposed shaft 16, both of which are housed in a casing 17 provided therefor. A bevel gear 18 is also mounted on this shaft 16, and is adapted to engage with either one of the gears 19 or 19ª which are slidably mounted on the longitudinally disposed shaft 20, each of these gears being formed with hubs turned to receive the forked end of the shifting arms 21 which are keyed on the manually operated shifting shaft 22, for shifting one or the other of the gears into engagement with the gear 18, and it will be obvious that the mechanism can be driven in either a forward or a reverse direction by merely shifting the said gears on the shaft 20. Any suitable means may be provided on the extended end of the shaft 22 for manually shifting the same.

One end of the shifting shaft is journaled in a boxing formed in the rear wall of the compartment 1ª, the opposite end being pivoted to a crank 23 keyed on a transversely disposed shaft 24 extending across the case, and having a similar crank 24ª mounted on the opposite end thereof. A pair of links 25 and 25ª are connected to this crank, and also to a pair of levers 26 and 26ª which are loosely mounted on the shaft 27, a gear member 28 being interposed between the said levers and journaled on the pin 29, this gear engaging a similar gear 30 which is mounted on the driven shaft 27. Gears 31 and 31ª are carried on similarly disposed shafts 32 and 32ª which are provided with small rollers fixedly mounted thereon, and on which a flexible curtain 33 is adapted to be wound, and it will be obvious that when the shifting member 22 is operated, the shaft 24 and the crank 24ª will be partially rotated. The members 26 and 26ª will rock on the shaft 27, and the gear 28 will be shifted into engagement with one of the gears 31 and 31ª and will positively drive one of the rollers. The curtain will, therefore, be unwound from the roller and wound on the other roller. This curtain is transparent and the different street names are painted thereon in proper spaced relation, an incandescent light 34 being provided behind the curtain for illuminating the street names, this light being connected to the wiring of the car in any approved manner.

It will be of course understood that when the car reaches the end of the line, the curtain will be unwound from the one roller and wound on the opposite driven roller, and in order that the street names may travel across the opening 35 in the front of the case in proper position, I provide a stationary member 36 which is curved as shown, and is formed with an elongated opening in the center thereof, to allow the occupants of the car to read the street names.

The edges of the stationary member 36 are turned so as not to catch and turn the curtain. One end of the member 36 is free, while the opposite end is secured to the wall of the case by means of bolts or rivets. It will be obvious that the curtain can be removed and replaced or re-wound without removing the stationary member 36. Attention is directed to the fact that when one of the curtain rollers is driven the opposite curtain roller is free to unwind, and to insure the curtain being taut at all times I provide the friction members 37 and 37ª. One pair is on each roller shaft, and the members 37 are keyed on the shafts 32 and 32ª, while the members 37ª are loosely mounted on the said shafts. These members 37ª are provided with laterally extending lugs which are formed integral with the said members 37ª, and the lever 39 is pivotally mounted between the lugs at a point intermediate of its ends, one end of the lever resting against the spring member 40 and the other end being engaged by a thumb screw 41. The thumb screw 41 is threaded into the wall of the case for adjusting the lever 39. This also adjusts the disks 37ª and varies the pressure between the same and the disks 37. These disks may be equipped with a brake lining for increasing the friction and creating a drag.

A bevel gear 42 is mounted on the shaft 20 and meshes with a similar gear 43 mounted on the vertically disposed shaft 45 This shaft is journaled in suitable bearings secured to the case 1, a sleeve 46 being slidably mounted thereon, and a small friction roller 47 secured on the sleeve. This friction roller is adapted to engage a large friction roller 48 carried on the end of the longitudinally disposed shaft 49, which extends to the spring B of the annunciating mechanism. The small friction roller 47 is shiftable across the face of the friction wheel 48 through the instrumentality of a lever 50 pivoted to the case at the point 51, the outer end being pivotally connected to one end of a link 52 which is in turn connected to a crank 53 solid on the shaft 24, and when the mechanism is shifted to revolve the curtain in the opposite direction, this friction roller 47 will be automatically shifted across the face of the friction wheel 48, thereby continuously winding the spring of the annunciating mechanism, the friction also allowing for slippage when the spring is tightly wound. The end of the lever 50 is slotted and engages a laterally projecting pin 54 carried by the sleeve 46. This shaft 49, as hereinafter fully described, is connected with the spring B and will always be driven in the proper direction for winding the spring of the annunciating mechanism.

The transverse shaft 27 carries a worm wheel 55 which engages the worm 56, set on the shaft 20 (Fig. 3), both the worm and worm wheel being contained in the housing 57 and provides the drive for the curtain and annunciating mechanism.

It will of course be understood that city blocks vary considerably in length, and I have therefore provided a plurality of records 58. One record is provided for each street, and the sound grooves are formed in the outer periphery of the record. The width of the periphery of the record will be in proportion to the length of the city block, and if desired, additional records may be inserted between the records bearing the names of the streets. These additional records may contain advertising matter and may be conveniently employed for giving the firm names, the place of business and the class of merchandise handled in various blocks throughout the route of the car.

In instances where the car travels a considerable distance without a stop, a speech or song may be inserted thereby furnishing entertainment and breaking the monotony of travel. It will be noted that there are two distinct and separate sets of records both of which are substantially alike, and these I prefer to form with a steel disk 59 having a pair of check plates 59ª secured thereto, the sound waves being recorded in a thin strip of material cast on the rim of this disk 59, thereby effecting a saving of this certain material, and reducing the cost of replacements. Openings 59ᵇ are provided in the disks for receiving the pins 60 see Fig. 7 and for fastening the records securely together, said records being mounted on the shafts 61 and 61ª respectively, as clearly shown in Figs. 3 and 8 of the drawings.

One end of each shaft 61 and 61ª is journaled in a bearing formed in the wall of the compartment 1ª, while the other end of each shaft 61 and 61ª is countersunk. A threaded bolt 62 which is mounted in a suitable threaded opening in the member 63 has a tapered extremity forming an adjustable pin point bearing for the countersunk end of the cooperating shaft. The members 63 and 63ª extend across the openings and they facilitate the removal of the records, so that in the event of breakage any one of the records may be easily removed. It is only necessary to raise one end of one of the members 63 and 63ª and allow it to swing downward to disengage the threaded bolt from the countersunk end of the shaft. This will afford ready access to the records and will enable the same to be easily removed and replaced. Gears 64 and 64ª are mounted on the opposite ends of these shafts 61 and 61ª so that each set of records is rotated in opposite directions, this being necessary due to the fact that the mechanism must be shifted to travel in the opposite direction when the car reaches the end of the line, so that the curtain will be unwound properly and the annunciating mechanism call the street names in proper rotation.

The annunciating mechanism comprises two separate tone arms 65 and 65ª pivotally connected to the tone horn 66 and set at an angle with relation to each other, so that when one tone arm is engaging one set of records, the opposite tone arm will be held in raised position until the end of the line is reached, and when the mechanism is reversed, the opposite tone arm 65ª is lowered to engage the opposite set of records which will then call the street names in proper rotation when traveling back over the line, while the first mentioned tone arm is automatically raised from the records.

A bracket 67 is secured to the end of the case and is formed with laterally extending wings 67ª in which thin metal strips 68 and 68ª are mounted. These strips are provided with a plurality of notches 68ᵇ having angled side walls, as clearly indicated in Fig. 10 of the drawings. The grooves are spaced apart and conform to the distance between the city blocks. The tone arms are provided with a downwardly projecting portion 65ᵇ. The end of the projecting portion 65ᵇ is wedge shaped and is adapted to engage the notches 68ᵇ formed in the strips 68 and 68ª. The said tone arms are caused to travel transversely across the case by a split bearing 69, which has a smooth lower half and an interiorly threaded upper half. The upper half engages the transversely disposed lead screw 70 (Fig. 3). A coiled spring 71 is interposed between the horn proper and the upper half of the bearing to insure proper engagement of the interiorly threaded upper half of the split bearing 69 and the threads of the lead screw. As the lead screw revolves the end of the member 65ᵇ will ride up the angled sides of the notches 68ᵇ and then drop into the next succeeding notch. This insures a continuous raising and lowering of the tone arm and the needle 73 will engage each record at the proper time.

The lead screw 70 is adapted to be driven by means of a gear 72 mounted on the shaft 16, this gear meshing with the gear 73ª mounted on the vertically disposed shaft 74 carried in suitable bearings secured to the walls of the case. A sleeve 75 is slidably mounted on the upper end of this shaft and carries a pair of bevel gears 76, which are adapted to be shifted into engagement with a gear 77 mounted on the end of the lead screw, and when the mechanism is reversed this sleeve together with the gears 76 are automatically shifted, so that when one gear is disengaged, the opposite gear will be shifted into engagement for reversing the direction of travel of the lead screw. This is accomplished by means of the lever 78 pivoted to the case at the point 78ª, one end being slotted to receive a pin 79 solid on the sleeve, while the opposite end is connected to a lever 80 which is in turn pivotally connected to the crank 24ª intermediate its length, so that when the shifting shaft 22 is manipulated to reverse the direction of travel of the mechanism, this sleeve will also be automatically shifted to reverse the direction of travel of the lead screw.

The case is formed with an elongated opening 81 in the upper front end thereof, the end of the tone horn 66 communicating with the opening and is adapted to travel across said opening by reason of the split bearing 69, the upper half of which is pivoted to the under side of the tone horn by means of the pin 82, being held in mesh with the screw by means of the spring as described, and when it is desired to shift the annunciating mechanism, it is merely necessary to grasp the lip 69ª raising the upper half of the bearing and the mechanism can be shifted as desired.

When the car has reached the end of its run or the line, it is merely necessary for the conductor to reverse the direction of travel of the mechanism by shifting the shifter shaft 22, this automatically shifts the double faced friction roller 47 to the opposite side of the friction wheel 48 so that the shaft 49 will continue to revolve in the same direction, so that the spring will not be unwound. The one tone arm is then raised, which automatically lowers the opposite tone arm so that the opposite set of records are engaged. The curtain will travel in the reverse direction and the street names will be called in proper order as the names are displayed. This will be a great convenience to strangers and people not familiar with the city. Such people generally know the name of their street destination, but frequently fail to understand the conductor's pronunciation of the street names, and ofttimes the conductor forgets to call the name of a street. With my improved mechanism the street will be automatically called and the name displayed, so that a passenger who can hear or read will at all times know the names of the streets which the car crosses. The entire mechanism will be light in weight so that it can be readily transferred from one car to another, and the operation of the mechanism will be timed and controlled by the track engaging wheels. Should however any adjustments be required at any time they can be easily made, as both sides of the case can be hinged to swing as a door or can be set in suitable keepers if desired, and all of the parts are readily accessible. The shaft 49 has keyed to it a sleeve A and the inner end of a coiled barrel spring B. This spring constitutes a driving spring for the annunciator mechanism. The sleeve A projects beyond the shaft 49 and receives one end of a shaft C. The end of the shaft C which is arranged within the sleeve is provided with an annular groove D which is engaged by a pin or key E carried by the sleeve. The pin or key E pierces the sleeve and engages in the groove for swiveling the shaft C to the shaft 49 and for holding the shaft C against longitudinal movement in the sleeve. This will permit the shafts 49 and C to rotate independently of each other. A fiber washer F, which is interposed between the adjacent ends of the shafts 49 and C is secured to the shaft C. A disk G which is fixed to the shaft C is connected to the outer end of the spring B by a pin H, whereby power is transmitted from the spring to the disk. The shaft C is equipped with a governor comprising a slidable collar I loosely mounted on the shaft C and provided with a groove J and connected to flexible members K. The flexible members K consist of springs secured at one end to the said collar and at the other end to the said shaft C adjacent to a worm M which meshes with a worm wheel O of the shaft 61. By this construction motion is transmitted to the shaft 61 which is connected by the gears 64 and 64ª, to the shaft 61ª. An adjustment is obtained by means of an angle lever P which is pivotally mounted at its angle. The angle lever has arms of unequal length, the longer arm being engaged with the collar I in an annular groove J thereof. The other arm of the angle lever is arranged to engage the periphery of the disk G. An adjusting screw R is mounted in the bracket Q, and a coiled spring S is interposed between the screw and the lever and is seated in the socket T of the lever.

To prevent the spring unwinding when the driving friction 47 is out of engagement, a ratchet wheel W is mounted on the shaft 49 and is engaged by a dog X pivotally mounted on a bracket Y. The dog rides on the ratchet wheel and prevents unwinding of the spring. The governor regulates the speed at which the shafts 61 and 61ª are driven.

From the foregoing description it will be apparent that I have perfected a very simple and economical street indicator and annunciator.

What I claim is:—

1. In a device of the class described, a built up record consisting of a series of sections, a traveling tone arm movable over the sections of the record, and a transversely disposed horizontal support extending across the device and located beneath the front portion of the tone arm and provided with means for directly engaging and successively raising and lowering the said tone arm as it travels across the record, and means for actuating the tone arm in its movement across the record.

2. In a device of the class described, a built up record consisting of a series of sections, a traveling tone arm movable over the record, a support for the front portion of the tone arm, said support consisting of a transverse bar extending across the device and arranged to directly receive and support the tone arm and provided with depressions having angled sides and adapted to directly engage and raise and lower the tone arm as the same travels across the record, and means for actuating the tone arm in its movement across the record.

3. In a device of the class described, a built up record consisting of a set of relatively thin discs clamped together side by side to form a cylindrical record, a traveling tone arm movable along the cylindrical record, a support consisting of a transverse bar located beneath the front portion of the tone arm and provided with means for directly engaging the tone arm to raise and lower the same when the tone arm is moved along the cylinder, and means for actuating the tone arm in its movement over the record.

4. In a device of the class described, a built up record consisting of a series of thin discs clamped together to form a sectional record cylinder and having their peripheral edges exposed and adapted to receive indicia, a tone arm movable over the built up record, a transverse bar located beneath the front portion of the tone arm and arranged to directly receive and support the same and provided with depressions having angled walls arranged to directly engage the tone arm to raise and lower the same as the tone arm travels over the record, and means for actuating the tone arm in its movement over the record.

5. In a device of the class described, a built up record consisting of a series of separate sections, a tone arm movable over the record and provided with a depending arm, brackets located at opposite sides of the device, a transverse bar extending across the device and seated at its ends upon the brackets and extending beneath the front portion of the tone arm and arranged to directly receive and support the same and provided in its upper face with depressions having angled walls arranged to directly engage the depending arm of the tone arm whereby the tone arm will be raised and lowered to lift it from one section of the built up record to another when the tone arm is moved over said record, and means for actuating the tone arm.

In testimony whereof I affix my signature.

EDWARD NIETHAMER.